United States Patent
Ichinose et al.

(10) Patent No.: US 7,351,453 B2
(45) Date of Patent: Apr. 1, 2008

(54) LIQUID CRYSTAL MEDIUM

(75) Inventors: Hideo Ichinose, Kanagawa Pref. (JP); Shinji Nakajima, Atsugi (JP); Takanori Takeda, Atsugi (JP); Masako Nakamura, Yamatokoriyama (JP); Yoshito Hashimoto, Mie (JP); Toshihiro Matsumoto, Nara (JP); Tsuyoshi Okazaki, Nara (JP)

(73) Assignee: Merck Patent GmbH, Darmstadt (DE)

( * ) Notice: Subject to any disclaimer, the term of this patent is extended or adjusted under 35 U.S.C. 154(b) by 159 days.

(21) Appl. No.: 11/286,343

(22) Filed: Nov. 25, 2005

(65) Prior Publication Data

US 2006/0115606 A1 Jun. 1, 2006

(51) Int. Cl.
*C09K 19/30* (2006.01)
*C09K 19/12* (2006.01)

(52) U.S. Cl. .............. 428/1.1; 252/299.63; 252/299.66
(58) Field of Classification Search ................. 428/1.1; 252/299.63, 299.66
See application file for complete search history.

(56) References Cited

U.S. PATENT DOCUMENTS

| | | | |
|---|---|---|---|
| 6,764,722 B2 * | 7/2004 | Klasen et al. ................. | 428/1.1 |
| 6,790,489 B2 * | 9/2004 | Klasen-Memmer et al. . | 428/1.1 |
| 2002/0014613 A1 * | 2/2002 | Klasen et al. .......... | 252/299.63 |
| 2004/0058158 A1 * | 3/2004 | Klasen-Memmer et al. ........................ | 428/411.1 |
| 2006/0124896 A1 * | 6/2006 | Klasen-Memmer et al. ..................... | 252/299.01 |
| 2006/0263544 A1 * | 11/2006 | Klasen-Memmer et al. ........................... | 428/1.1 |
| 2007/0080324 A1 * | 4/2007 | Klasen-Memmer et al. ..................... | 252/299.62 |

FOREIGN PATENT DOCUMENTS

DE 10354404 * 6/2004

* cited by examiner

*Primary Examiner*—Shean C Wu
(74) *Attorney, Agent, or Firm*—Millen, White, Zelano, Branigan, P.C.

(57) ABSTRACT

Liquid crystal (LC) media based on a mixture of polar compounds having negative dielectric anisotropy, their use in electro-optical displays, especially those having active matrix addressing based on the ECB (electrically controlled birefringence) or VA (vertically aligned) mode or similar modes, and LC displays of these types, are described.

18 Claims, No Drawings

LIQUID CRYSTAL MEDIUM

The invention relates to a liquid crystal (LC) medium based on a mixture of polar compounds having negative dielectric anisotropy, in particular for electro-optical displays having active matrix addressing based on the ECB (electrically controlled birefringence) or VA (vertically aligned) mode, including further developments like MVA (multidomain VA), PVA (patterned VA) or ASV (advanced super view) mode and the like.

For displays having substantially homeotropic surface alignment, like displays of the above ECB, VA or ASV mode, special customized LC media are required. Thus, the LC media should have negative dielectric anisotropy and low values for the voltage holding ratio (HR) after UV exposure. Furthermore, for industrial application in electro-optical display the LC media should generally have high chemical resistance to moisture, air and physical effects such as heat, radiation in the infra-red, visible and ultra-violet regions and direct and alternating electrical fields, furthermore an LC phase in a suitable temperature range and a low viscosity. For TV and monitor applications, LC media are desired which have a fast response time and a low threshold voltage, furthermore a good LTS (low temperature stability).

However, the LC media of prior art with negative dielectric anisotropy often do not have the above-mentioned required properties to a satisfying extent.

Thus, there continues to be a great demand for displays of the VA mode or of related modes, which have a negative $\Delta\varepsilon$, very high resistivity at the same time as a wide operating temperature range, short response times and low threshold voltage.

The present invention has the aim of providing LC media, in particular for ECB, VA and ASV displays, which do not have the above-mentioned disadvantages or only do so to a reduced extent, and preferably simultaneously have very high specific resistances, low threshold voltages, good LTS and fast switching times. Another aim is to extend the pool of LC media available to the expert. Other aims will become evident to those in the art from the following description.

It has been found that these aims, for example, can be achieved if LC media according to the present invention are used in displays.

The present invention thus relates to an LC medium comprising, by weight 5 to 27%, preferably 7 to 25% of one or more compounds of formula I,
2 to 45%, preferably 4 to 40% of one or more compounds of formula II,
12 to 23%, preferably 13 to 22% of one or more compounds of formula III,
0 to 20% of one or more compounds of formula IV,
18 to 28%, preferably 19 to 27% of one or more compounds of formula V,
0 to 12% of one or more compounds of formula VI,
0 to 14% of one or more compounds of formula VII,
0 to 18% of one or more compounds of formula VIII,

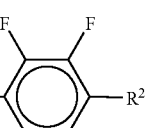

I

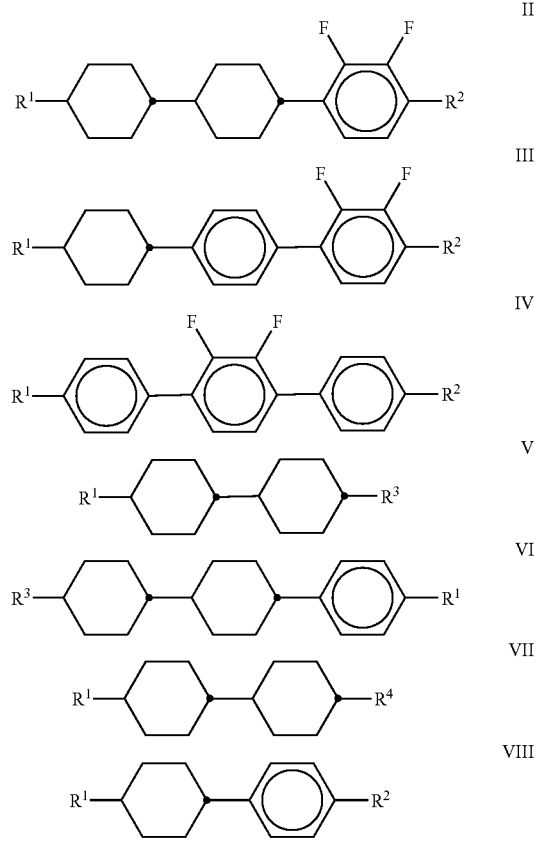

in which
$R^1$ and $R^4$ are independently of each other methyl, ethyl, n-propyl, n-butyl, n-pentyl or n-hexyl, $R^4$ can also be methoxy,
$R^2$ is methyl, ethyl, n-propyl, n-butyl, n-pentyl, n-hexyl, methoxy, ethoxy, n-propoxy, n-butoxy or n-pentoxy,
$R^3$ is vinyl or 1E-propenyl.

Very preferred is an LC medium comprising
one, two or three compounds of formula I, wherein $R^1$ is n-propyl or n-pentyl and $R^2$ is ethoxy or n-butoxy,
one, two, three or four compounds of formula II, wherein $R^1$ is n-propyl, n-butyl or n-pentyl and $R^2$ is ethoxy or n-propoxy,
optionally one or two compounds of formula II, wherein $R^1$ is ethyl or n-butyl and $R^2$ is methyl,
one or two compounds of formula III, wherein $R^1$ is ethyl or n-propyl and $R^2$ is ethoxy or n-propoxy,
optionally one or two compounds of formula IV, wherein $R^1$ is ethyl or n-propyl and $R^2$ is n-propyl or n-butyl,
one, two or three compounds of formula V, wherein $R^1$ is n-propyl, n-butyl or n-pentyl and $R^3$ is vinyl or 1E-propenyl,
optionally one compound of formula VI, wherein $R^3$ is vinyl and $R^1$ is methyl,
optionally one or two compounds of formula VII, wherein $R^1$ is n-propyl and $R^4$ is n-butyl, n-pentyl or methoxy, and
optionally one or two compounds of formula VIII, wherein $R^1$ is n-propyl or n-pentyl and $R^2$ is methoxy or n-propyl.

Further preferred embodiments relate to (all percents by weight):
- an LC medium comprising 7 to 12% of one or more compounds of formula I,
- an LC medium comprising 16 to 24% of one or more compounds of formula I,
- an LC medium comprising 10 to 20% of one or more compounds of formula II,
- an LC medium comprising 2 to 10% of one or more compounds of formula II,
- an LC medium comprising 25 to 40% of one or more compounds of formula II,
- an LC medium comprising 14 to 20% of one or more compounds of formula IV,
- an LC medium comprising 5 to 10% of one or more compounds of formula IV,
- an LC medium comprising no compounds of formula IV,
- an LC medium comprising 6 to 12% of one or more compounds of formula VI,
- an LC medium comprising no compounds of formula VI,
- an LC medium comprising 4 to 14% of one or more compounds of formula VII,
- an LC medium comprising no compounds of formula VII,
- an LC medium comprising 10 to 18% of one or more compounds of formula VII,
- an LC medium comprising no compounds of formula VIII.

In the pure state, the compounds of the formulae I-VIII are colorless and form liquid crystalline mesophases in a temperature range which is favorably located for electro-optical use. They are stable chemically, thermally and to light.

The compounds of the formulae I-VIII are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The LC mixtures according to the invention enable a significant widening of the available parameter latitude. Especially, it was found that they have a fast switching time, low threshold voltage, good LTS, high specific resistance, high UV stability and high capacity holding ratio (HR). Also, the achievable combinations of clearing point, rotational viscosity $\gamma_1$, low $\Delta n$ and dielectric anisotropy $\Delta\epsilon$ are superior to materials known from prior art.

In particular, the LC media according to the present invention have a negative dielectric anisotropy $\Delta\epsilon$ of a moderate or small absolute value, and a moderate or small value of the perpendicular dielectric constant $\epsilon_\perp$. When using these LC media in displays of the active matrix type, the capacitance of the pixels can be reduced. The LC media according to the present invention are especially suitable for applications in LCD panels with large screen size, like TV and billboards, especially for displays of the ASV mode, like ASV-TV.

Preferably the LC media have a birefringence $\Delta n$ from 0.09 to 0.12, very preferably from 0.09 to 0.10 or from 0.11 to 0.12. Further preferably the LC media have a dielectric anisotropy $\Delta\epsilon$ from −2.5 to −3.5. Further preferably the LC media have a value of the dielectric constant perpendicular to the longitudinal molecular axes $\epsilon_\perp$ from 5.8 to 6.8. Further preferably the LC media have a rotational viscosity of less than 140 mPa·s.

The invention furthermore relates to an electro-optical display based on the ECB, VA or ASV mode, preferably having active matrix addressing, characterized in that it contains as dielectric an LC medium as described above. In these displays, the LC layer preferably has a homeotropic or tilted homeotropic orientation in the switched-off state and contains an LC medium as described above.

The construction of an LC display according to the invention, including for example electrode base plates and surface-treated electrodes corresponds to the conventional construction for displays of this type. The term "conventional construction" covers all derivatives and modifications of the LC display.

The LC mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The liquid-crystal mixture may also contain further additives known to the person skilled in the art and described in the literature. For example, 0-15% by weight of pleochroic dyes can be added. The liquid-crystal mixture may also contain UV stabilizers or antioxidants. Some suitable stabilizers are shown below.

In the present application and in the examples below, the structures of the components of the LC media are indicated by the following acronyms:

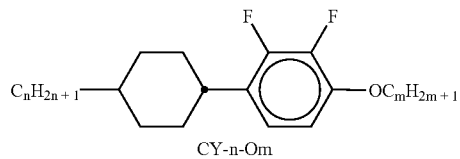
CY-n-Om

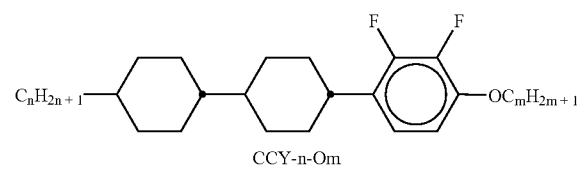
CCY-n-Om

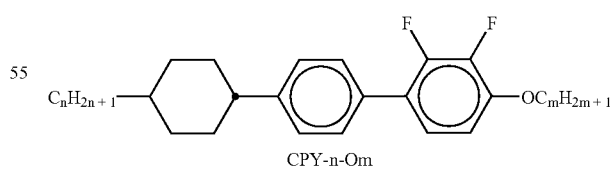
CPY-n-Om

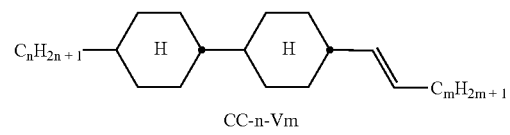
CC-n-Vm

-continued
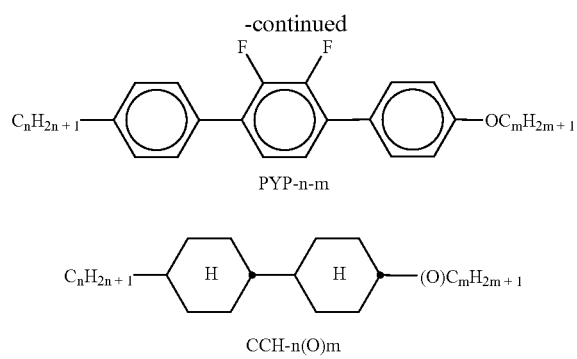
PYP-n-m
CCH-n(O)m
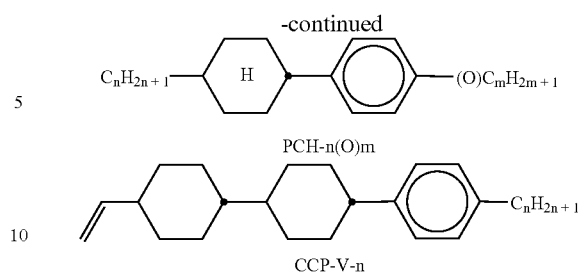
PCH-n(O)m
CCP-V-n
The following list shows possible stabilizers that can be added, for example, to the LC media according to the present invention:
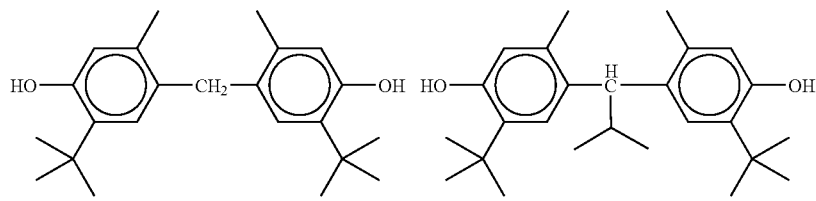
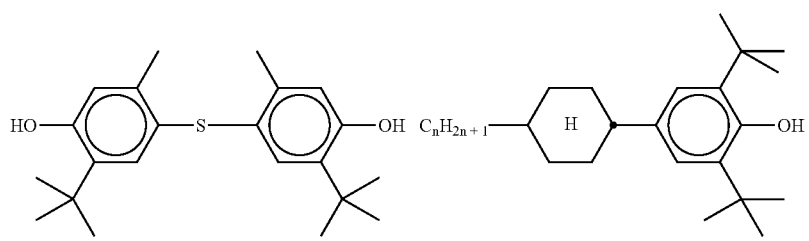
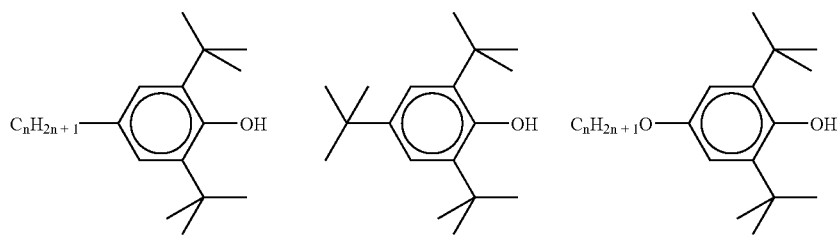
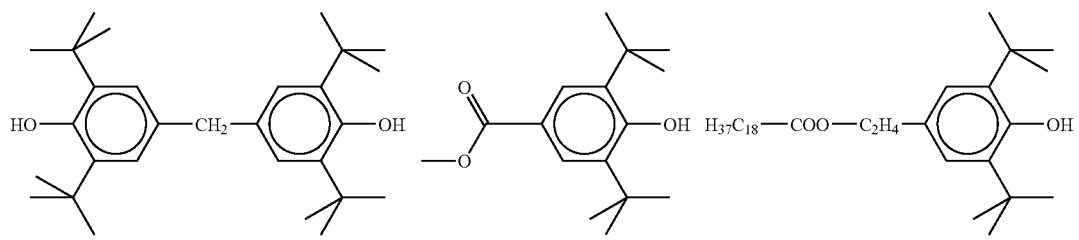

-continued
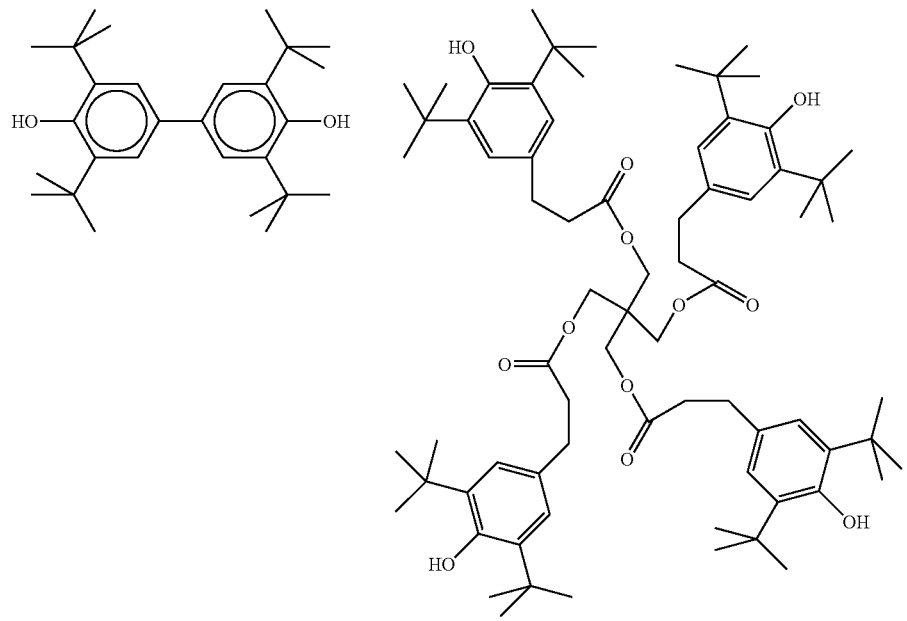
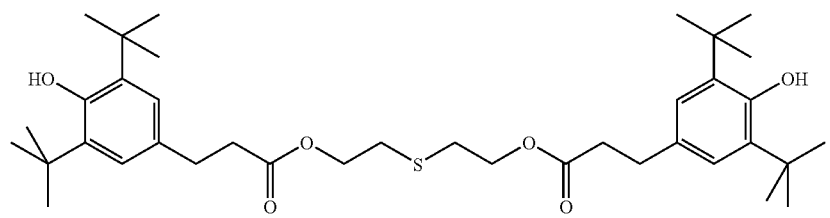
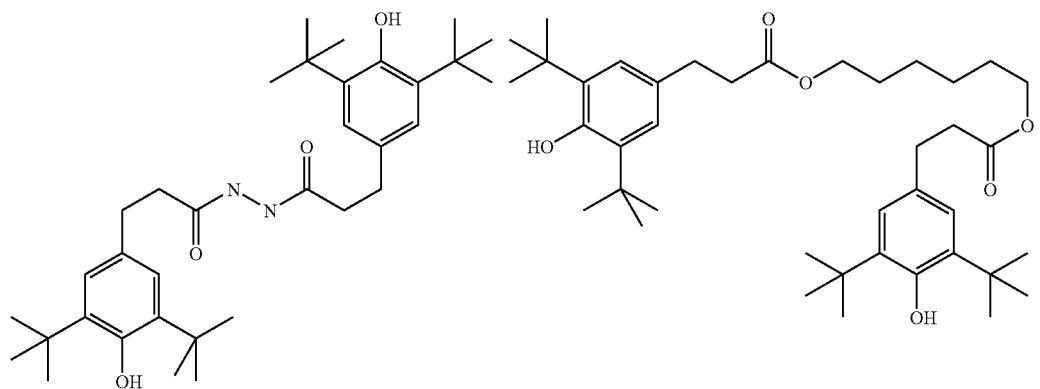

-continued
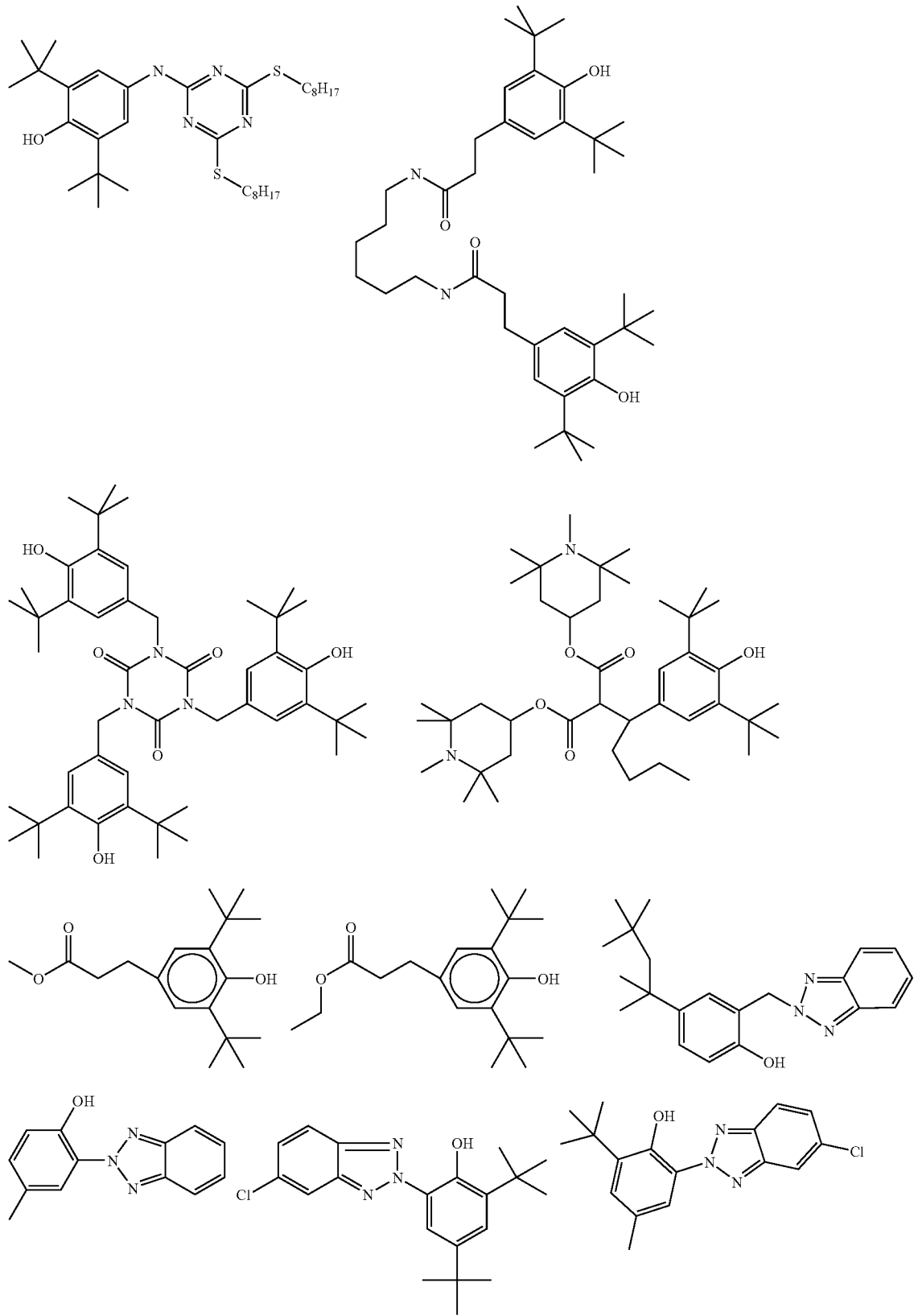

-continued
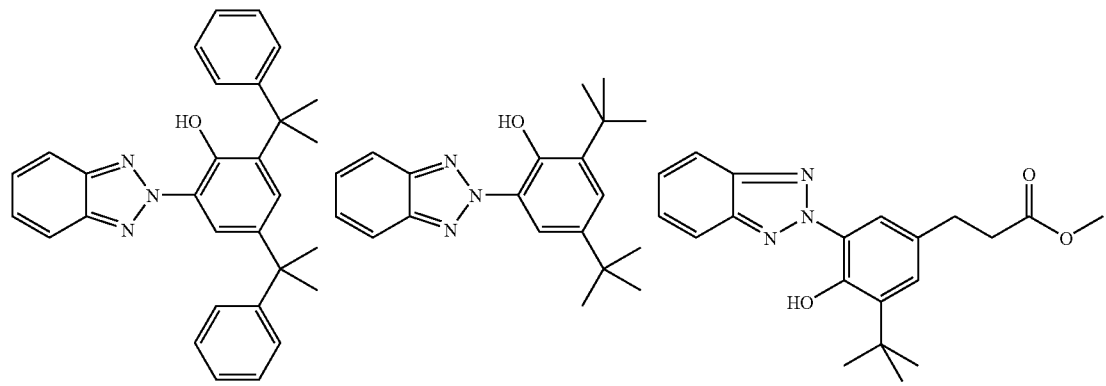
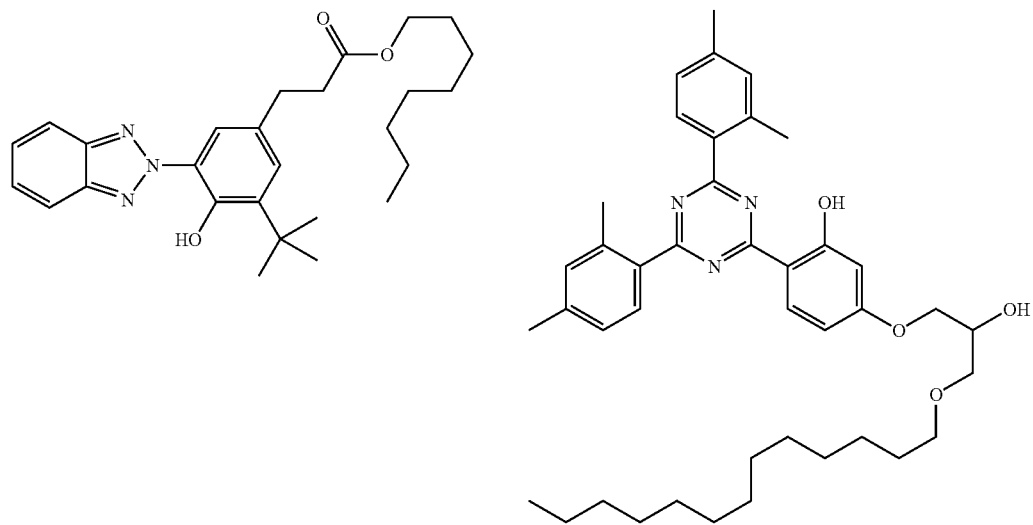
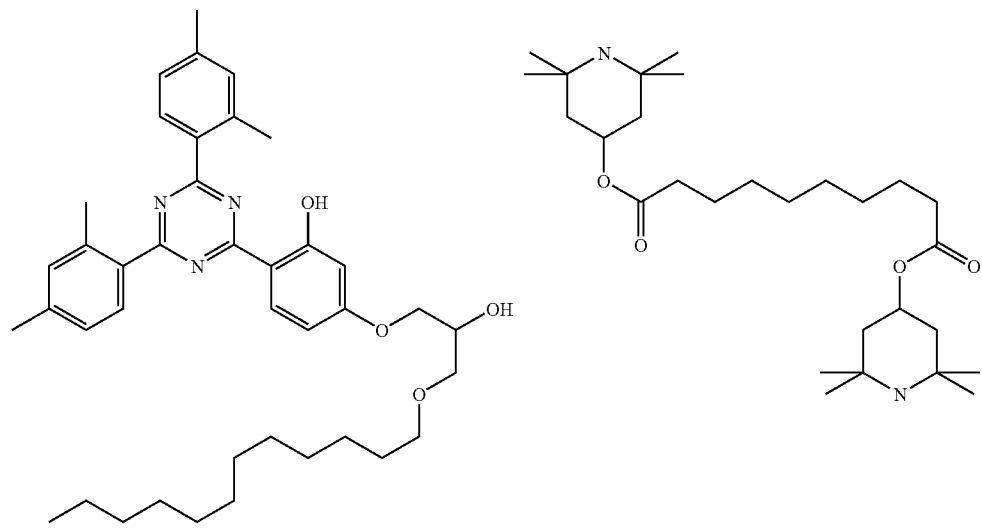

-continued

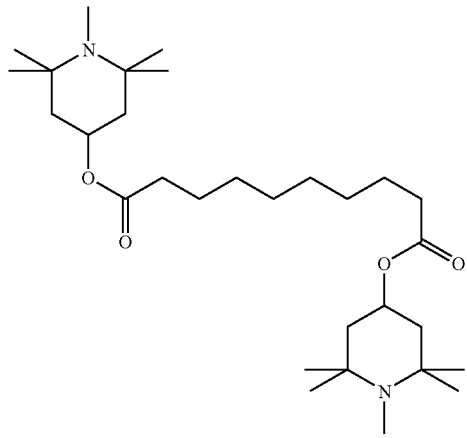

Unless stated otherwise, above and below, percentages are percent by weight and all temperatures are given in degrees Celsius. The following abbreviations are used: m.p.=melting point, cl.p.=clearing point, furthermore C=crystalline state, N=nematic phase, S=smectic phase and I=isotropic phase, the data between these symbols representing the transition temperatures. $\Delta n$=optical anisotropy and $n_o$=refractive index (589 nm, 20° C.). $v_{20}$=flow viscosity (mm$^2$/sec), $\gamma_1$=rotational viscosity [mPa·s], each determined at 20° C. $V_{10}$=voltage for 10% transmission (viewing angle perpendicular to the plate surface). $t_{on}$=switch-on time, $t_{off}$=switch-off time at an operating voltage corresponding to 2 times the value of $V_{10}$. $\Delta\varepsilon$=dielectric anisotropy ($\Delta\varepsilon=\varepsilon_\parallel-\varepsilon_\perp$, where $\varepsilon_\parallel$=dielectric constant parallel to the longitudinal molecular axes and $\varepsilon_\perp$=dielectric constant perpendicular thereto). All optical data are measured at 20° C. unless stated otherwise.

Unless stated otherwise, the display used for measurement of the threshold voltage has two plane-parallel outer plates at a separation of 5 µm and, on the inside of the outer plates, electrode layers with lecithin alignment layers on top which cause a homeotropic alignment of the LCs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE 1

| A liquid crystal mixture comprising | | | |
|---|---|---|---|
| CY-5-O2 | 8.0% | cl.p. | 81° C. |
| CCY-3-O3 | 7.0% | $\Delta n$ | 0.1156 |
| CCY-4-O2 | 7.0% | $\gamma_1$ | 120 |
| CPY-2-O2 | 11.0% | $\Delta\varepsilon$ | −2.6 |
| CPY-3-O2 | 10.0% | $\varepsilon_\perp$ | 6.0 |
| PYP-2-3 | 8.0% | | |
| PYP-2-4 | 9.0% | | |
| CC-4-VO | 20.0% | | |
| CCH-34 | 7.0% | | |
| PCH-301 | 9.0% | | |
| PCH-53 | 4.0% | | |

EXAMPLE 2

| A liquid crystal mixture comprising | | | |
|---|---|---|---|
| CY-3-O4 | 10.0% | cl.p. | 81° C. |
| CCY-3-O2 | 6.0% | $\Delta n$ | 0.0916 |
| CCY-3-O3 | 8.0% | $\gamma_1$ | 138 |
| CCY-4-O2 | 8.0% | $\Delta\varepsilon$ | −3.0 |
| CCY-2-1 | 9.0% | $\varepsilon_\perp$ | 6.4 |
| CCY-3-1 | 8.0% | | |
| CPY-2-O2 | 8.0% | | |
| CPY-3-O2 | 8.0% | | |
| CC-4-VO | 19.0% | | |
| PCH-53 | 16.0% | | |

EXAMPLE 3

| A liquid crystal mixture comprising | | | |
|---|---|---|---|
| CY-3-O4 | 20.0% | cl.p. | 80.9° C. |
| CY-5-O4 | 3.0% | $\Delta n$ | 0.0960 |
| CCY-3-O2 | 6.0% | $\gamma_1$ | 124 |
| CCY-3-O3 | 6.0% | $\Delta\varepsilon$ | −3.3 |
| CCY-4-O2 | 5.5% | $\varepsilon_\perp$ | 6.7 |
| CPY-2-O2 | 8.0% | | |
| CPY-3-O2 | 8.0% | | |
| PYP-2-3 | 6.0% | | |
| CC-3-V1 | 10.0% | | |
| CC-5-VO | 15.0% | | |
| CCH-34 | 10.0% | | |
| CCH-35 | 2.5% | | |

EXAMPLE 4

| A liquid crystal mixture comprising | | | |
|---|---|---|---|
| CY-3-O4 | 16.0% | cl.p. | 80.7° C. |
| CY-5-O4 | 6.0% | Δn | 0.1161 |
| CCY-3-O3 | 4.0% | $\gamma_1$ | 126 |
| CPY-2-O2 | 10.0% | Δε | −2.9 |
| CPY-3-O2 | 11.0% | $\varepsilon_\perp$ | 6.4 |
| PYP-2-3 | 7.5% | | |
| PYP-2-4 | 8.0% | | |
| CC-5-VO | 17.0% | | |
| CC-3-V1 | 7.5% | | |
| CCP-V-1 | 8.0% | | |
| CCH-34 | 5.0% | | |

EXAMPLE 5

| A liquid crystal mixture comprising | | | |
|---|---|---|---|
| CY-3-O4 | 4.0% | cl.p. | 95.2° C. |
| CY-5-O4 | 4.0% | Δn | 0.0978 |
| CY-5-O2 | 8.0% | $\gamma_1$ | 144 |
| CCY-3-O2 | 8.0% | Δε | −3.1 |
| CCY-4-O2 | 7.0% | $\varepsilon_\perp$ | 6.5 |
| CCY-5-O2 | 3.0% | | |
| CCY-3-O3 | 7.0% | | |
| CPY-2-O2 | 6.0% | | |
| CPY-3-O2 | 7.0% | | |
| PYP-2-4 | 5.0% | | |
| CC-3-V1 | 7.0% | | |
| CC-5-V | 10.0% | | |
| CC-4-V | 7.0% | | |
| CCP-V-1 | 9.0% | | |
| CCH-35 | 2.0% | | |
| CCH-3O1 | 6.0% | | |

The entire disclosure of all applications, patents and publications, cited herein and of corresponding Application No. EP 04028196.6n No., filed Nov. 26, 2004, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium comprising, by weight:
5 to 27% of one or more compounds of formula I,
2 to 45% of one or more compounds of formula II,
12 to 23% of one or more compounds of formula III,
5 to 10% of one or more compounds of formula IV,
18 to 28% of one or more compounds of formula V,
0 to 12% of one or more compounds of formula VI,
0 to 14% of one or more compounds of formula VII,
0 to 18% of one or more compounds of formula VIII,

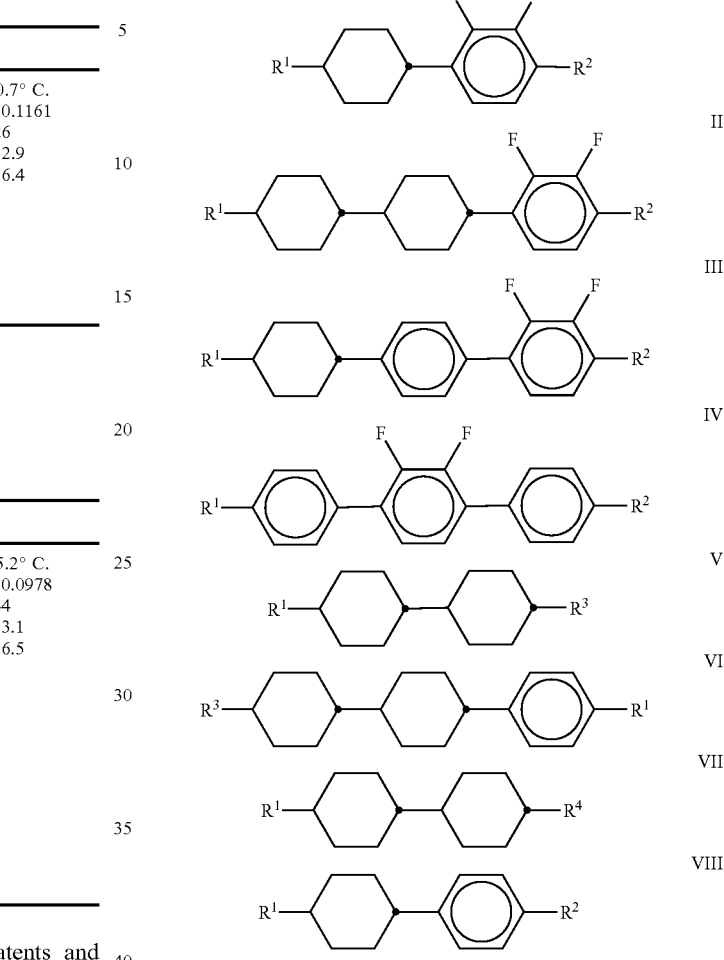

in which
$R^1$ and $R^4$ are independently of each other methyl, ethyl, n-propyl, n-butyl, n-pentyl or n-hexyl, R4 can also be methoxy,
$R^2$ is methyl, ethyl, n-propyl, n-butyl, n-pentyl, n-hexyl, methoxy, ethoxy, n-propoxy, n-butoxy or n-pentoxy,
$R^3$ is vinyl or 1E-propenyl.

2. A liquid crystal medium according to claim 1, which comprises:
one, two or three compounds of formula I, wherein $R^1$ is n-propyl or n-pentyl and $R^2$ is ethoxy or n-butoxy,
one, two, three or four compounds of formula II, wherein $R^1$ is n-propyl, n-butyl or n-pentyl and $R^2$ is ethoxy or n-propoxy,
optionally one or two compounds of formula II, wherein $R^1$ is ethyl or n-butyl and $R^2$ is methyl,
one or two compounds of formula III, wherein $R^1$ is ethyl or n-propyl and $R^2$ is ethoxy or n-propoxy,
one or two compounds of formula IV, wherein $R^1$ is ethyl or n-propyl and $R^2$ is n-propyl or n-butyl,
one, two or three compounds of formula V, wherein $R^1$ is n-propyl, n-butyl or n-pentyl and $R^3$ is vinyl or 1E-propenyl,
optionally one compound of formula VI, wherein $R^3$ vinyl and $R^1$ methyl, and optionally one or two compounds of formula VII, wherein $R^1$ is n-propyl and $R^4$ is n-butyl, n-pentyl or methoxy, optionally one or two compounds of formula VIII, wherein $R^1$ is n-propyl or n-pentyl and $R^2$ is methoxy or n-propyl.

3. A liquid crystal medium according to claim 1, which has a birefringence Δn from 0.09 to 0.12.

4. A liquid crystal medium according to claim 2, which has a birefringence Δn from 0.09 to 0.12.

5. A liquid crystal medium according to claim 1, which has a dielectric anisotropy Δ∈ from −2.5 to −3.5.

6. A liquid crystal medium according to claim 2, which has a dielectric anisotropy Δ∈ from −2.5 to −3.5.

7. A liquid crystal medium according to claim 3, which has a dielectric anisotropy Δ∈ from −2.5 to −3.5.

8. A liquid crystal medium according to claim 1, which has a value of the dielectric constant perpendicular to the longitudinal molecular axes ∈⊥ from 5.8 to 6.8.

9. A liquid crystal medium according to claim 1, which has a value of the dielectric constant perpendicular to the longitudinal molecular axes ∈⊥ from 5.8 to 6.8.

10. A liquid crystal medium according to claim 2, which has a value of the dielectric constant perpendicular to the longitudinal molecular axes ∈⊥ from 5.8 to 6.8.

11. A liquid crystal medium according to claim 3, which has a value of the dielectric constant perpendicular to the longitudinal molecular axes ∈⊥ from 5.8 to 6.8.

12. A liquid crystal medium according to claim 5, which has a value of the dielectric constant perpendicular to the longitudinal molecular axes ∈⊥ from 5.8 to 6.8.

13. An electro-optical liquid crystal display containing a liquid crystal medium according to claim 1.

14. An electro-optical liquid crystal display containing a liquid crystal medium according to claim 2.

15. An electro-optical liquid crystal display containing a liquid crystal medium according to claim 3.

16. An electro-optical liquid crystal display containing a liquid crystal medium according to claim 5.

17. An electro-optical liquid crystal display containing a liquid crystal medium according to claim 8.

18. An electro-optical display according to claim 13, which has active matrix addressing and is based on the ECB, VA or ASV mode.

* * * * *